Oct. 14, 1924.

E. HARRISON 1,511,608

DYNAMO ELECTRIC MACHINE

Filed Aug. 29, 1919

Inventor
ERNEST HARRISON
By Franks Addleman
Attorney

Patented Oct. 14, 1924.

1,511,608

UNITED STATES PATENT OFFICE.

ERNEST HARRISON, OF NEWCASTLE-ON-TYNE, ENGLAND.

DYNAMO-ELECTRIC MACHINE.

Application filed August 29, 1919. Serial No. 320,658.

*To all whom it may concern:*

Be it known that I, ERNEST HARRISON, a subject of the King of Great Britain, residing at 56 Clara Street, Benwell, Newcastle-on-Tyne, in the county of Northumberland, England, have invented certain new and useful Improvements in and Relating to Dynamo-Electric Machines, of which the following is a specification.

This invention is particularly applicable to dynamo electric machines designed for use on motor cars, cycles and the like, but may also be applied to dynamo electric machines in general.

It is common practice to employ two independent windings upon the core of a dynamo armature and to take direct current from one and alternating current from the other by well known devices.

As applied to dynamo electric machines designed for use on motor cars, cycles and the like, the object of my invention is to provide an improved one unit machine adapted for lighting electric lamps, charging accumulators, supplying current either directly to the sparking plugs, or through an induction coil if necessary, and rotating and starting an internal combustion engine according to requirements.

According to my invention, the armature which is of the shuttle type contains longitudinal slots in its periphery besides the usual two large channels or slots, and it is wound with two separate and distinct windings, as hereinafter explained. Also in combination with such an armature, I propose to employ magnetic shunts as explained hereinafter.

Figure 1:
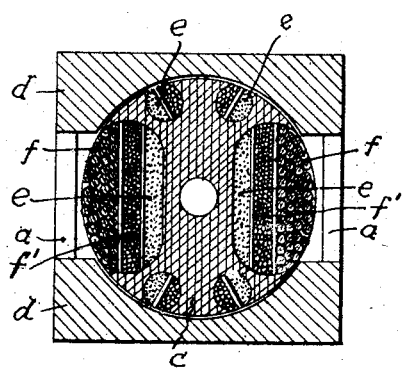
Figure 2:
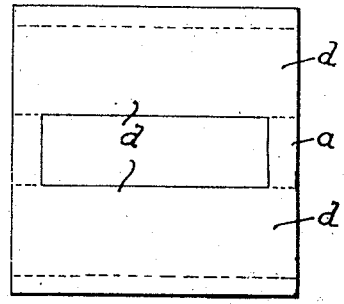
Figure 3:
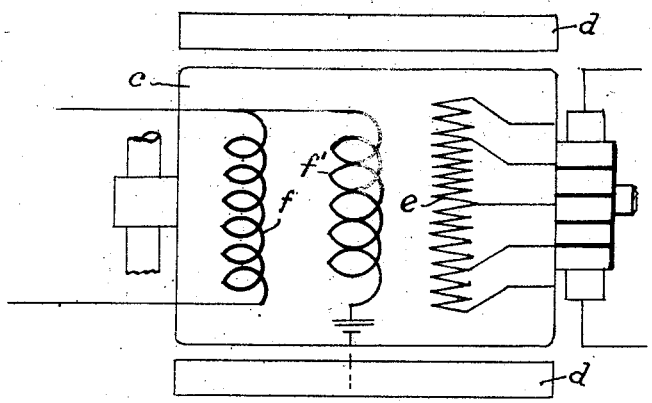
Figure 4:
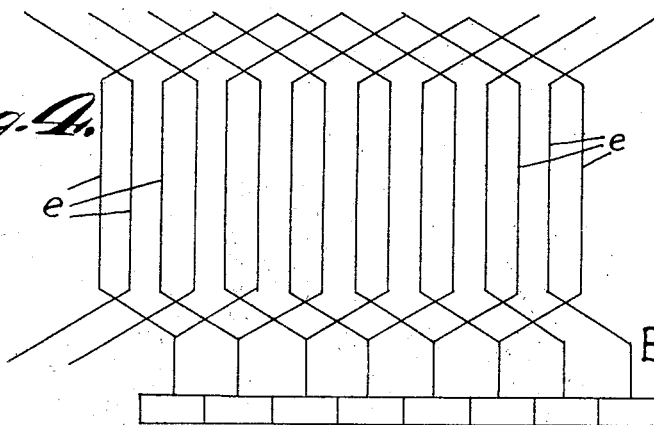

The accompanying drawings illustrate the invention diagrammatically, Figure 1 being a transverse section; Fig. 2 is an elevation at right angles to Fig. 1, omitting the armature. Fig. 3 is a diagrammatic representation of the armature, the windings and the field poles, and Fig. 4 is a layout view of the direct current windings.

A machine manufactured according to my invention, consists of a special armature $c$, of the shuttle type, pole pieces $d$, together with high voltage secondary windings $f$, low voltage primary windings $f'$, and direct current windings $e$, there being present a commutator and some form of make and break mechanism.

The special form of my armature $c$ is such that an A. C. winding $f$ is placed in the large slots of the armature and over an ordinary D. C. winding $e$, and that, whereas the winding $f$ is situated in the large channels as usual, the other winding $e$ is wound both in the said large channels and in special slots which are located in the periphery of the shuttle armature. Figure 1 shows the A. C. winding $f$ over the winding $e$, as well as over the low voltage primary winding $f'$. The two windings $e$ and $f$ are quite independent of each other. The turns of the wire of each coil of the winding $e$ pass across the center axis, as usual, and the end of one coil is joined to the beginning of the next, the two ends together being connected to one bar of the commutator. This sequence is continued throughout the successive windings, the whole forming a closed circuit, which is the ordinary practice in lap-wound armatures.

Now it will be seen that, if the armature $c$ is caused to revolve in a suitable magnetic field, or the magnet caused to revolve around the armature, an A. C. of high voltage is produced in the winding $f$ which can be used for ignition or other purposes as required and simultaneously a separate direct current is produced in the winding $e$, which, taken through a suitable commutator, becomes D. C. and can be used for charging accumulators, lighting lamps or other purposes as required; also that there is provided a low voltage primary winding $f'$ which is connected to a ground and to the high voltage secondary winding $f$.

Secondly, if the armature is placed in a suitable magnetic field and current from an outside source is supplied through a commutator to the D. C. winding $e$ this will cause the armature to revolve and thereby produce A. C. high voltage in the winding $f$. This A. C. may be used for ignition of an internal combustion engine whilst the surplus power supplied to the armature by the D. C. from the outside source may be used for turning an internal combustion engine through a suitable gear for the purpose of starting or any other purpose required.

The field poles may be of ordinary formation, but when necessary that the machine shall automatically regulate its voltage I connect the horns of the poles $d$ by magnetic shunts $a$ in such a manner that the armature reaction causes some of the magnetism to be shunted across the ends of the gap between the pole pieces $d$ by the shunts $a$. The use of magnetic shunts is already known in magneto generators, and I do not claim such device broadly. The sectional area of the metallic shunts *a* together with the distance between the pole pieces *dd* is determined by the voltage required.

I claim:

1. A dynamo electric machine having an armature of shuttle type, with longitudinal slots in its periphery besides the usual two large channels or slots, the armature being wound with two separate and independent windings, one of which is situated in the large channels as usual and supplies alternating current and the other one, which is intended for direct current, is wound both in the large channels and in the slots which are located in the periphery.

2. In a dynamo electric machine, an armature of the shuttle type which has two large channels or slots, and other channels or slots, the armature being wound to provide two separate and independent windings, one of which is situated in the large channels and supplies alternating current, the other winding being in both of the large channels or slots and in the other channels or slots to supply direct current, in combination with field pole pieces with magnetic paths which bridge the usual air gaps, the purpose of these bridge pieces being to divert some of the magnetism to produce a weaker field with increase of speed to preserve a constant voltage at varying speeds.

ERNEST HARRISON.

Witnesses:
MARGUERITE L. ROWLEY,
SAMUEL J. ALFORD.